(12) United States Patent
Sugita

(10) Patent No.: US 11,076,059 B2
(45) Date of Patent: Jul. 27, 2021

(54) DATA TRANSMISSION APPARATUS THAT CAN SET DESTINATION SUCH AS E-MAIL ADDRESS RECEIVED FROM EXTERNAL APPARATUS ON TRANSMISSION SETTING SCREEN AND CONTROL METHOD THEREFOR

(71) Applicant: CANON KABUSHIKI KAISHA, Tokyo (JP)

(72) Inventor: Hikaru Sugita, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/430,248

(22) Filed: Jun. 3, 2019

(65) Prior Publication Data

US 2019/0379796 A1 Dec. 12, 2019

(30) Foreign Application Priority Data

Jun. 7, 2018 (JP) .............................. JP2018-109865

(51) Int. Cl.
*H04N 1/00* (2006.01)
*H04N 1/32* (2006.01)
*H04L 29/08* (2006.01)

(52) U.S. Cl.
CPC ......... *H04N 1/00225* (2013.01); *H04L 67/02* (2013.01); *H04N 1/00214* (2013.01); *H04N 1/00334* (2013.01); *H04N 1/32106* (2013.01)

(58) Field of Classification Search
CPC ........... H04N 1/00225; H04N 1/00214; H04N 1/00334; H04N 1/32106; H04L 67/02
See application file for complete search history.

(56) References Cited

U.S. PATENT DOCUMENTS

2017/0171402 A1* 6/2017 Yamaguchi ........ H04N 1/32101
2017/0171414 A1* 6/2017 Naito ................. H04N 1/32106
2017/0339151 A1* 11/2017 Van Os ................. H04W 12/06

FOREIGN PATENT DOCUMENTS

JP 2017-108341 A 6/2017

* cited by examiner

*Primary Examiner* — Juan M Guillermety
(74) *Attorney, Agent, or Firm* — Canon U.S.A., Inc. IP Division

(57) ABSTRACT

A data transmission apparatus that transmits data and receive at least a destination of the data from an external apparatus includes a reader that reads an image of an original, a network interface that transmits image data of the read image, a display that displays a setting screen including a display field for at least the destination of the data, a receiver that receives the destination data displayed in the display field from the external apparatus, and a controller that performs control such that the display is turned on based on receipt of the destination and that the setting screen where the destination is input in the display field is displayed.

20 Claims, 12 Drawing Sheets

FIG. 5

|  | CONTROL UNIT 110 | OPERATION UNIT 116 | READING UNIT 118 | PRINTING UNIT 120 |
|---|---|---|---|---|
| ACTIVE STATE | ○ | ○ | ○ | ○ |
| POWER SAVING STATE | ○ | × *1 | ○ | ○ |
| SLEEP STATE | × *3 | × *1 | × *2 | × |
| POWER OFF STATE | × | × | × | × |

○ POWER SUPPLY PRESENT
× POWER SUPPLY ABSENT

*1: DISPLAY UNIT OF TOUCH PANEL IS TURNED OFF, BUT TOUCH SENSOR CAN SENSE USER OPERATION
*2: ORIGINAL DETECTION SENSOR CAN DETECT ORIGINAL
*3: CPU 111 CAN RECEIVE INTERRUPTION, COMMUNICATION UNIT I/F 125 CAN RECEIVE DATA, AND FAX UNIT I/F 123 CAN RECEIVE FAX DATA

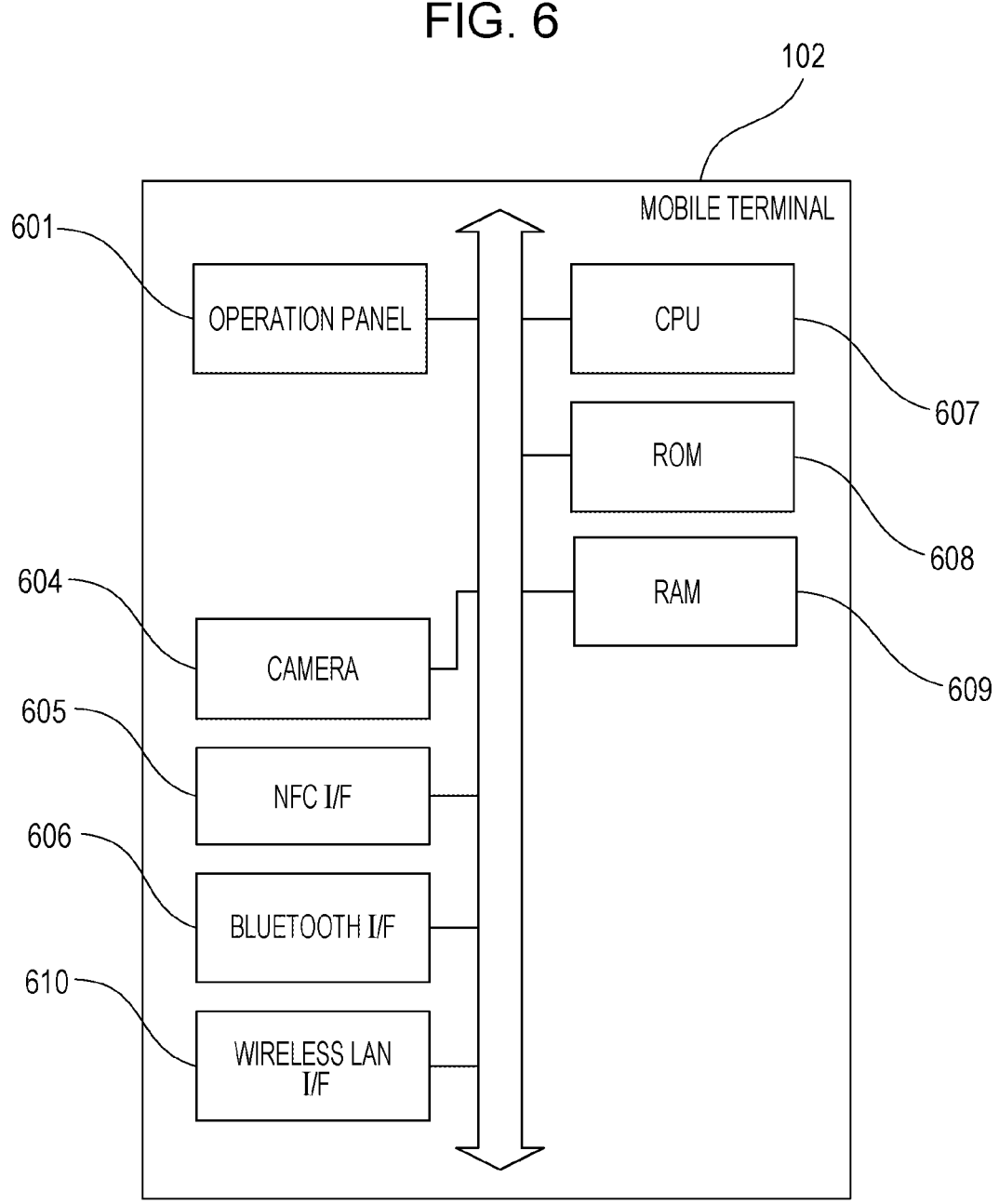

DATA TRANSMISSION APPARATUS THAT CAN SET DESTINATION SUCH AS E-MAIL ADDRESS RECEIVED FROM EXTERNAL APPARATUS ON TRANSMISSION SETTING SCREEN AND CONTROL METHOD THEREFOR

BACKGROUND

Field

The present disclosure relates to a data transmission apparatus that sets setting data received from an external apparatus onto a transmission setting screen and a control method therefor.

Description of the Related Art

A multi-function peripheral (MFP) having various functions such as a print function, a scan function, and a facsimile (FAX) function is known. In addition, an MFP to which a mail function is included is also known. The mail function enables performing transmission of an E-mail to which an original (document) image obtained by reading an original (document) by a scanner is attached as a file to the E-mail. While an address book is typically stored in the MFP, in a case where transmission of the E-mail is to an address not stored in the address book of the MFP, a user is required to input the address on a transmission setting screen for the E-mail. To alleviate an input operation of the user at the MFP, Japanese Patent Laid-Open No. 2017-108341 describes a technology for merging a mail address stored in an address book of a mobile terminal into the MFP.

According to Japanese Patent Laid-Open No. 2017-108341, the mail address is not to be reflected on a setting screen unless the setting screen for setting a destination of the E-mail is displayed on the MFP side and then the mail address is transmitted from the mobile terminal. That is, when a screen other than the setting screen is displayed on the MFP side or when a display unit is turned off and does not display anything, even if a user operates the mobile terminal to merge the mail address into the MFP, the merging operation is not be performed.

SUMMARY

In view of the above, the present disclosure provides a technology with which, even when a display unit is turned off, setting data such as an E-mail address from a mobile terminal can be received, and a setting screen on which the received setting data is reflected is displayed.

According to an aspect of the present disclosure, a data transmission apparatus that can transmit data and receive at least a destination of the data from an external apparatus includes a reader configured to read an image of an original, a network interface configured to transmit image data of the read image, a display configured to display a setting screen including a display field for at least the destination of the data, a receiver configured to receive the destination data displayed in the display field from the external apparatus, and a controller configured to perform control such that the display is turned on based on receipt of the destination and that the setting screen where the destination is input in the display field is displayed.

Further features will become apparent from the following description of exemplary embodiments with reference to the attached drawings.

BRIEF DESCRIPTION OF THE DRAWINGS

FIG. 5 illustrates power supply states of respective units in respective power states.

FIG. 6 illustrates a hardware configuration of a mobile terminal.

DESCRIPTION OF THE EMBODIMENTS

Hereinafter, exemplary embodiments will be described in detail with reference to the drawings.

According to the present exemplary embodiment, an example of a multi-function peripheral (MFP) having a print function, a scan function, a FAX function, and the like will be described as a data transmission apparatus.

First Exemplary Embodiment

Figure 1:
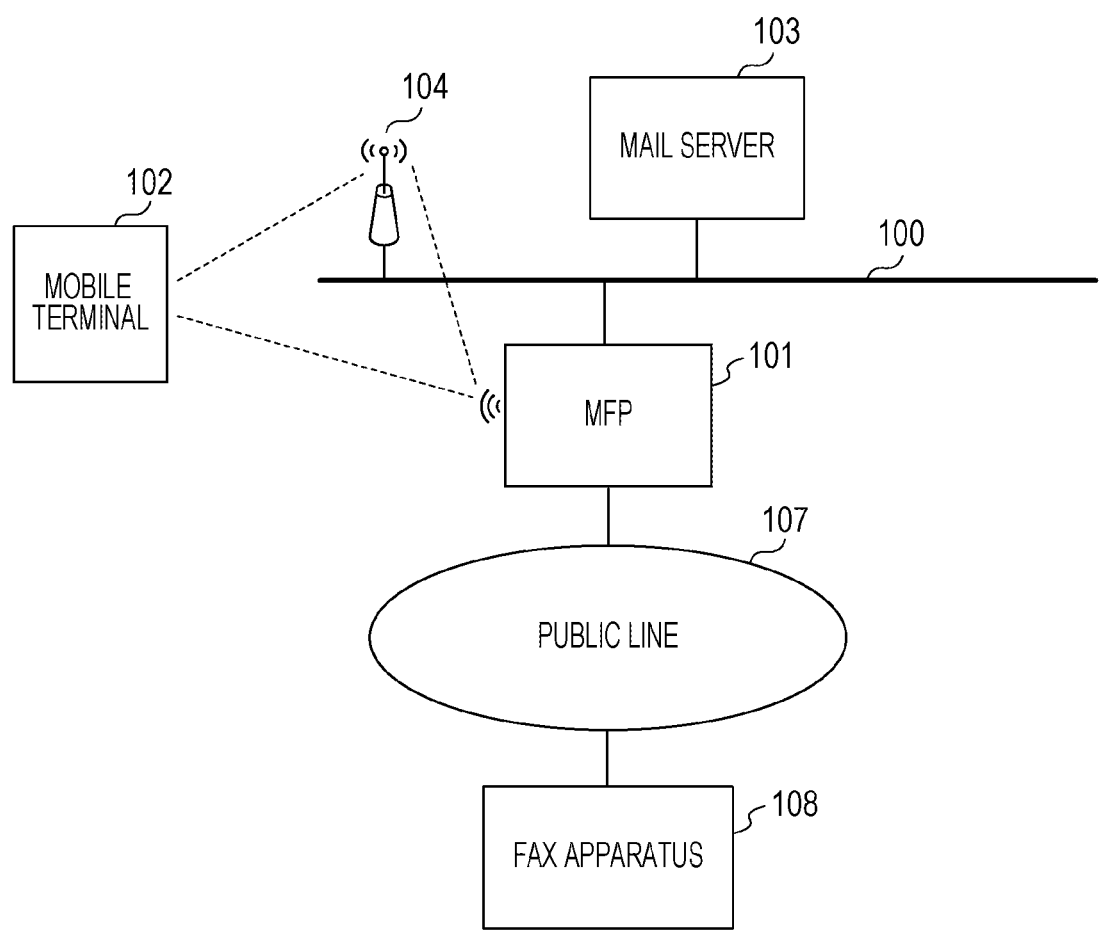
FIG. 1 illustrates a system configuration.

FIG. 1 is a block diagram illustrating an example of a system configuration according to the first exemplary embodiment. An MFP 101, a mail server 103, and an access point 104 are connected to one another via a network 110. In addition, the MFP 101 is connected to a FAX apparatus 108 via a public line 107. A mobile terminal 102 is connected to the access point 104 so as to be wirelessly communicable. The MFP 101 has a wireless communication function and can also wirelessly communicate with the mobile terminal 102 and the access point 104.

The MFP 101 can transmit an E-mail while image data of a scanned original or data stored in a storage is set as an attachment file. The MFP 101 transmits the E-mail to a destination indicated by a mail address via the mail server 103. The mail server 103 transmits the E-mail received external from the MFP 101 or transfers the E-mail received from the MFP to another mail server.

Figure 2:
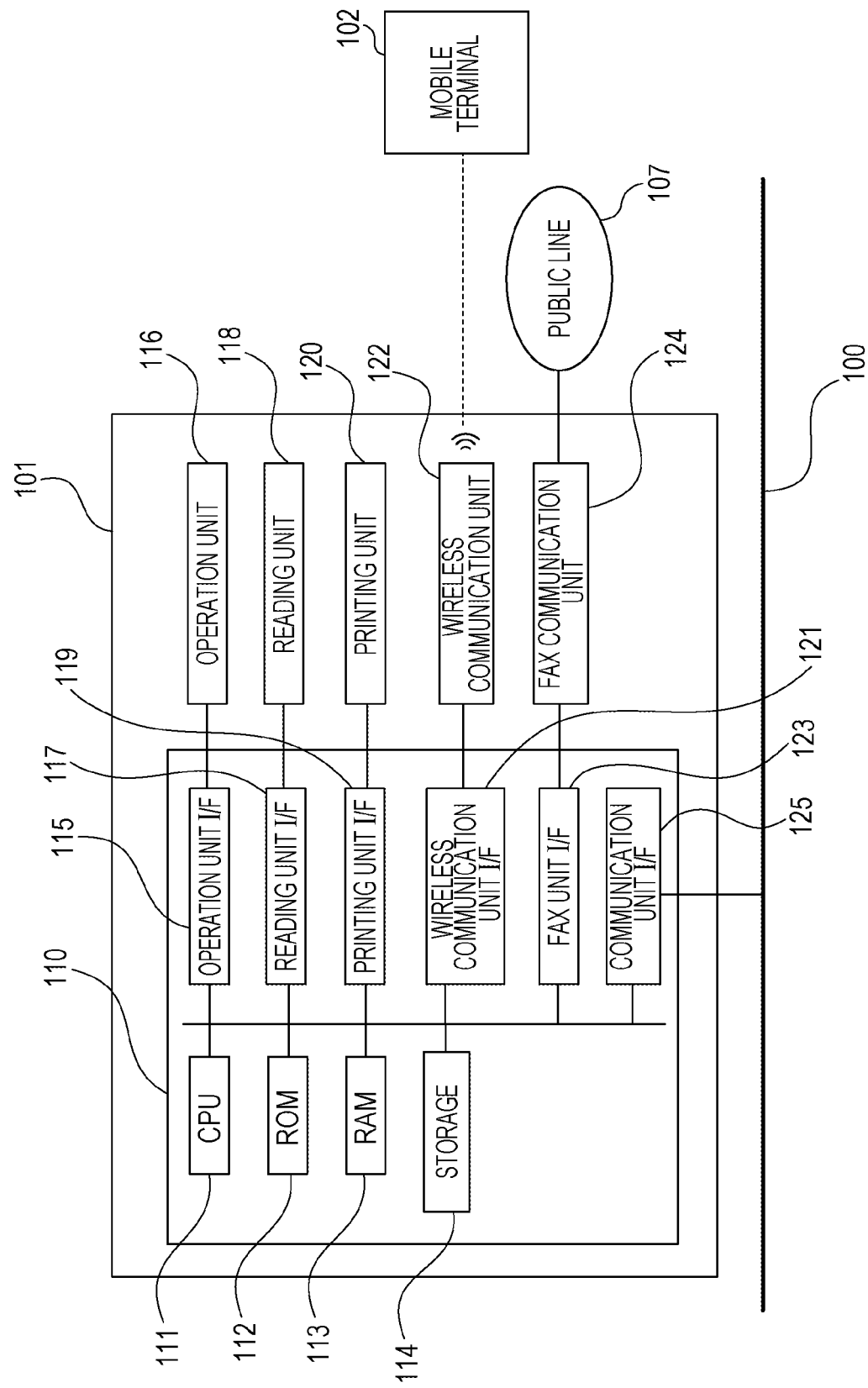
FIG. 2 is a block diagram illustrating a configuration of an MFP.

FIG. 2 is a block diagram illustrating a configuration of the MFP 101 according to the present exemplary embodiment.

A control unit 110 controls the MFP 101. The control unit 110 includes a CPU 111, a ROM 112, a RAM 113, and a storage 114. The CPU 111 reads out a control program stored in the ROM 112 or the storage 114 and performs various controls such as reading control and printing control. The ROM 112 stores the control program that is executed by the CPU 111. In addition, the ROM 112 stores a boot program, font data, and the like. The RAM 113 is a main storage memory for the CPU 111 and is used as a work area of the CPU 111. In addition, the RAM 113 is used as a temporary storage area for developing various control programs stored in the ROM 112 and the storage 114. The storage 114 stores image data, print data, various programs, and various setting information. While the storage 114 according to the present exemplary embodiment is a flash memory, the storage 114 can be any storage such as an SSD, an HDD, an eMMC, or the like.

The control unit 110 also includes an operation unit I/F 115, a reading unit I/F 117, a printing unit I/F 119, a wireless communication unit I/F 121, a FAX unit I/F 123, and a communication unit I/F 125. The operation unit I/F 115 connects an operation unit 116 and the control unit 110 with each other. The operation unit 116 includes a display unit and a touch sensor. The operation unit 116 displays information for a user and receives an input from the user. The reading unit I/F 117 connects a reading unit 118 and the control unit 110 with each other. The reading unit 118 reads the image of an original and converts the read image into image data such as binary data. The image data generated by the reading unit 118 is transmitted to an external apparatus or printed on a recording sheet. The printing unit I/F 119 connects a printing unit 120 and the control unit 110 with each other. The CPU 111 transmits image data of a printing target stored in the RAM 113 to the printing unit 120 via the printing unit I/F 119. The printing unit 120 prints the image corresponding to the received image data on a recording sheet fed from a feeding cassette (not illustrated).

The wireless communication unit I/F 121 is an interface for controlling a wireless communication unit 122 and connects the control unit 110 and a wireless device (for example, the mobile terminal 102) with each other. The FAX unit I/F 123 is an interface for controlling a FAX communication unit 124 and connects the control unit 110 and the FAX communication unit 124 with each other. The FAX communication unit 124 is connected to the public line 107. The FAX communication unit 124 includes a model for a facsimile communication and a network control unit (NCU). The communication unit I/F 125 connects the control unit 110 to the network 110. The communication unit I/F 125 transmits the image data and other information from the MFP 101 to the external apparatus via the network 110 and receives the print data and other information from the external apparatus via the network 110. The MFP 101 can perform transmission and reception of an E-mail using Post Office Protocol (POP) or Simple Mail Transfer Protocol (SMTP) via the network 110. The MFP 101 can also perform transmission and reception of a file using File Transfer Protocol (FTP) or Server Message Block (SMB). In addition, the MFP 101 can perform transmission and reception of a file using Web-based Distributed Authoring and Versioning (WEBDAV). The MFP 101 has a WEB server function and can also cause the external apparatus to display histories of transmission jobs and reception jobs and the like by an access based on HTTP from the external apparatus such as the mobile terminal 102.

Figure 3:
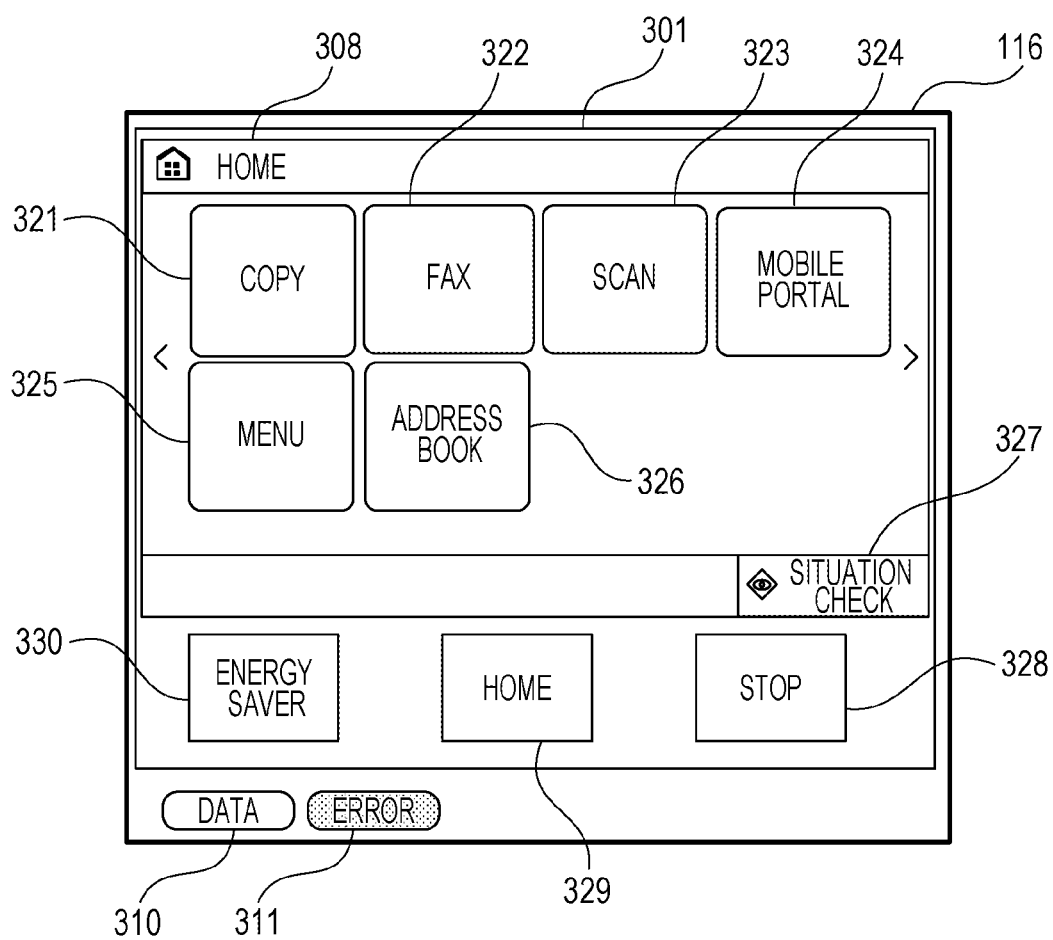
FIG. 3 illustrates an operation unit.

FIG. 3 illustrates an operation unit. The operation unit 116 includes a touch panel 301 that displays an operation screen, an LED 310, and an LED 311. The touch panel 301 is a device in which the display unit configured to display information and the touch sensor configured to the user operation with respect to the display unit are integrated. The user operates a screen displayed on a touch panel 320 by using a finger, a stylus, or the like and provides instructions to execute processing based on the operated location. A screen of the touch panel 301 illustrated in FIG. 3 is a home screen 308. The home screen 308 is a screen displayed at the beginning upon activation of the MFP 101. The home screen 308 includes a copy button 321, a FAX button 322, a scan button 323, a mobile portal 324, a menu button 325, and an address book button 326. In addition, the home screen 308 includes a situation check button 327, a stop button 328, a home button 329, and an energy saver button 330.

The copy button 321 is a button for displaying a screen (copy setting screen) for inputting copy settings, such as the number of copies, magnification, color/monochrome, and the size of the sheet to be fed.

The FAX button 322 is a button for displaying a screen (FAX transmission setting screen) for inputting facsimile transmission settings, such as a destination (FAX number), a resolution, and a density. The MFP 101 transmits the image data read by the reading unit 118 or the image data stored in the storage 114 to the destination indicated by the FAX number set on the FAX transmission setting screen.

The scan button 323 is a button for displaying a screen (scan setting screen) for inputting scan settings. The scan setting screen is a screen for inputting E-mail transmission settings, such as a destination (E-mail address) (see FIG. 4), a screen for inputting file transmission settings, or a screen for inputting Internet FAX transmission settings.

The mobile portal 324 is a screen for displaying an SSID of the MFP 101 or a network key. A detail of this screen will be described with reference to FIG. 11C.

The menu button 325 is a button for displaying a screen for performing an environment setting such as a use language and settings of respective functions.

The address book button 326 is a button for displaying the address book stored in the MFP 101. A detail of an address book screen 400 will be described with reference to FIG. 4.

The situation check button 327 is a button for displaying a screen (situation check screen) indicating a state of the MFP 101. The situation check screen displays a job execution situation, such as being executed or standing by). A button displayed on the touch panel 320 can also be a hardware button.

The stop button 328 is a button to execute cancellation of various operations. The stop button 328 located a lower region of the touch panel 320 even in a case where a screen other than the home screen 308 is displayed.

The home button 329 is a button for displaying the home screen 308. Similarly as in the stop button 328, the home button 329 is located in the lower region of the touch panel 320 even in a case where a screen other than the home screen 308 is displayed. The energy saver button 330 is a button for shifting the power state of the MFP 101 from an active state to a power saving state. Similarly as in the stop button 328 and the home button 329, the energy saver button 330 is located in the lower region of the touch panel 320 even in a case where a screen other than the home screen 308 is displayed.

The LED 310 and the LED 311 are configured to visually notify the user of the state of the MFP 101. The LED 310 is turned on during reception or execution of an E-mail or a print job, and the LED 311 is turned on when an error occurs in the MFP 101.

Figure 4:
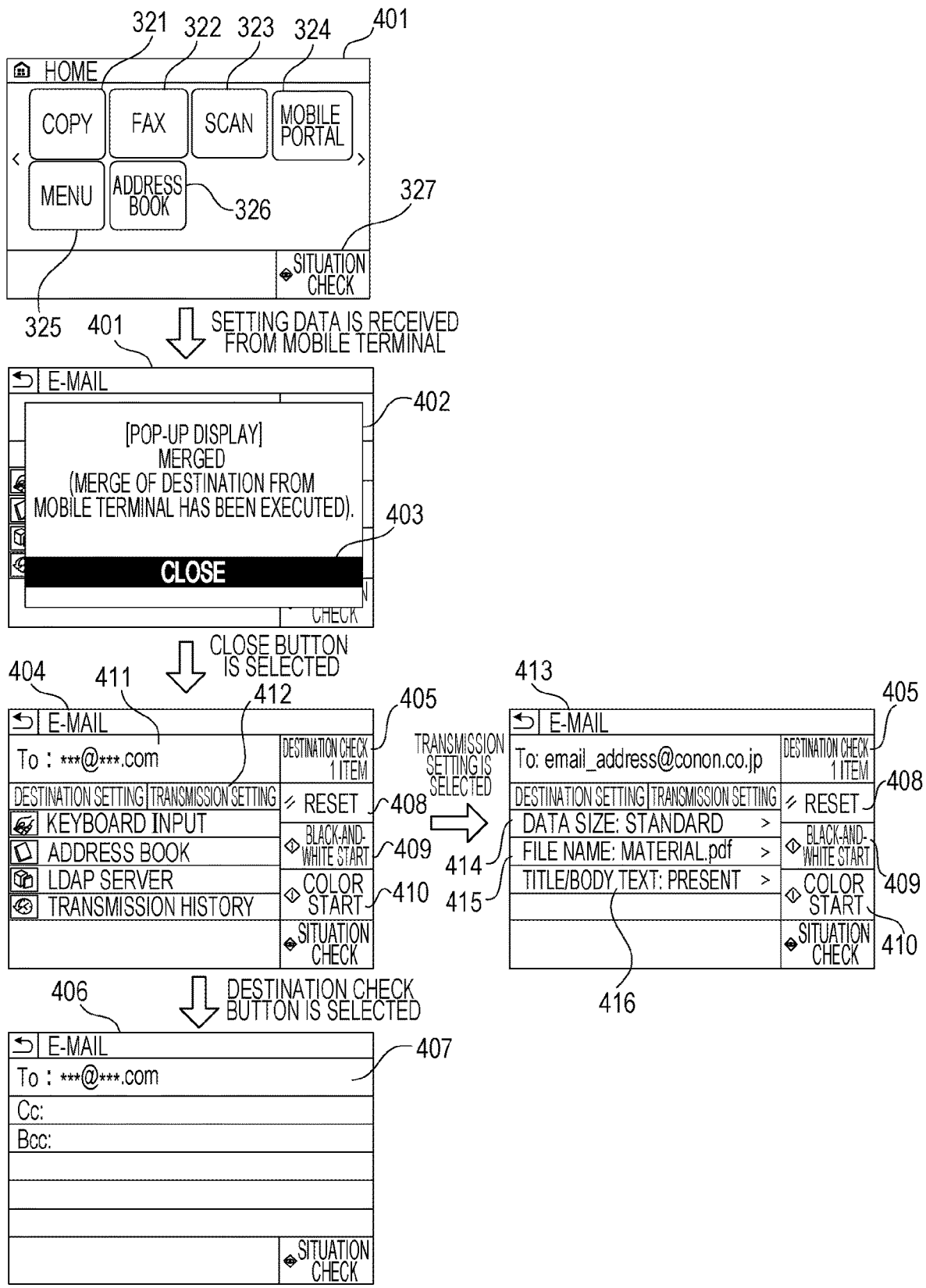
FIG. 4 illustrates transition of screens displayed on a touch panel.

FIG. 4 illustrates transition of screens displayed on the touch panel of the MFP.

FIG. 4 illustrates a home screen 401. The home screen 308 illustrated in FIG. 3 and the home screen 401 illustrated in FIG. 4 are the same screen. The home screen 401 is an example of a screen where the setting data from the mobile terminal 102 that will be described below can be received.

The setting data according to the present exemplary embodiment refers to the E-mail address indicating the destination of the E-mail, the title of the E-mail, the file name of the file attached to the E-mail, and the body text of the E-mail. The setting data can be at one or more of the E-mail address, the title, the file name, or the body text. In addition, the setting data can be the FAX number.

When the setting data is received from the mobile terminal 102 during the display of the home screen 401, the CPU 111 displays a pop-up screen 402. The pop-up screen 402 disables operations with respect to the home screen 401. Herein, operations with respect to various buttons such as the situation check button 327 of the home screen 401 are not to be performed.

The pop-up screen 402 is a screen for notifying the user of reception of the setting data from the mobile terminal 102 in a wireless or wired manner. The setting data (the E-mail address, the title, the file name, the body text, and the title) received from the mobile terminal 102 can also be displayed on the pop-up screen 402. In addition, a check button (not illustrated) for checking the detail of the setting data can be displayed on the pop-up screen 402, and the setting data can be displayed when the check button is pressed by the user.

The pop-up screen 402 includes a close button 403 for closing the pop-up screen. When the close button 403 is selected, the CPU 111 displays an E-mail transmission screen 404 on which the setting data received from the mobile terminal 102 has been reflected on the touch panel 320.

The E-mail transmission screen 404 is a screen for inputting the E-mail transmission settings. The number of the destinations of the E-mail is displayed in the destination check field 405. According to the present exemplary embodiment, when one destination is set, "1 item" is displayed in a destination check field 405. When the destination check field 405 is selected by the user, a destination check screen 406 is displayed on the touch panel 320. In a case where reset 408 is selected by the user on the E-mail transmission screen 404, the set information is cleared. At this time, the communication between the MFP 101 and the mobile terminal 102 is reset. In a case where black-and-white start 409 or color start 410 is selected by the user on the E-mail transmission screen 404, black-and-white or color data is transmitted to the address where the E-mail is set. In a case where the black-and-white start 409 is selected, the MFP 101 transmits the black-and-white image data, and in a case where the color start 410 is selected, the MFP 101 transmits the color image data.

An E-mail check screen 413 is a screen for checking the E-mail setting contents. The E-mail check screen 413 is displayed when a transmission setting button 412 on the E-mail transmission screen 404 is selected by the user. The E-mail check screen 413 includes a size field 414 indicating the data size, a file name field 415 indicating the file name of the attached data, and a title/body text display field 416 for displaying the contents of the title and the body text.

A resetting method for the communication between the MFP 101 and the mobile terminal 102 will now be described. The MFP 101 can perform the communication with the mobile terminal 102 by way of HTTP, where the MFP 101 manages the communication based on HTTP by a session ID. The session ID is an ID transmitted from a server (the MFP 101) to a client (the mobile terminal 102). The MFP 101 transmits the generated session ID to the logged-in mobile terminal 102, and the session ID is saved in the RAM 113. The mobile terminal 102 is connected to the MFP 101 by using the session ID received at the time of the login. The MFP 101 determines whether the mobile terminal is the same mobile terminal 102 at the time of the login based on the received session ID and the saved session ID. The MFP 101 determines that the mobile terminal is the same mobile terminal 102 when the session ID matches and determines that the mobile terminal is a different mobile terminal when the session ID differs. Resetting of the communication with the mobile terminal 102 refers to establishment of a state in which the session ID saved in the RAM 113 is deleted, and the currently communicating mobile terminal does not exist. When the state is shifted to this state, a new login request can be accepted.

The destination check screen 406 is a screen for checking the destination of the E-mail. The destination check screen 406 according to the present exemplary embodiment is displayed when the destination check field 405 is selected. Destination data 407 (for example, email_address@conon.co.jp) is the setting data received from the mobile terminal 102.

FIG. 5 illustrates power supply states of respective units in respective power states of the MFP.

Symbols (○ and x) in FIG. 5 indicate power supply states with respect to the respective units. The state in which the power is supplied is indicated by "○", and the state in which the power supply is stopped is indicated by "x".

The MFP 101 includes the active state, the power saving state, a sleep state, and a power off state. The MFP 101 can also include states other than the above-described states.

The active state corresponds to a state in which the various functions included in the MFP 101 can be executed. In the active state, power is supplied to the control unit 110, the operation unit 116, the reading unit 118, and the printing unit 120.

The power saving state is a power state in which more power is saved than in the active state. The power state is shifted to the power saving state in a case where a predetermined power saving transition condition is satisfied in the active state. This predetermined power saving transition condition is, for example, selection of the energy saver button 330 (see FIG. 3) arranged in the operation unit 116. The power saving state corresponds to a state in which the display unit of the touch panel 320 of the operation unit 116 is turned off. In addition, in the power saving state, the touch sensor of the touch panel 320 is in a state in which the user operation can be sensed, and when the touch sensor senses the user operation in the power saving state, an interruption from the power saving state to the active state is issued. When the CPU 111 receives the interruption from the operation unit 116, the power state of the MFP 101 shifts from the power saving state to the active state.

The sleep state is a power state in which more power is saved than in the power saving state. The power state is shifted to the sleep state in a case where a predetermined sleep transition condition is satisfied either in the active state or in the power saving state. This predetermined sleep transition condition is an elapse of a previously determined sleep transition time. This sleep transition time is a variable value and can be set by the user.

In the sleep state, the power supply to the control unit 110, the operation unit 116, the reading unit 120, and the reading unit 118 is stopped except for a situation where a return from the sleep state is detected. In the sleep state, the power supply is stopped except for the situation where the interruption of the CPU 111 is detected. In the sleep state, to receive the data or the FAX data from the network 110, the power supply to the communication unit I/F 125 that receives network data and the FAX unit I/F 123 that receives the FAX data is not stopped. In addition, the sleep state is a state in which the touch sensor of the operation unit 116 can sense the user operation. The sleep state is also a state in which an original detection sensor (not illustrated) of the reading unit 118 can sense the original.

In a case where the communication unit I/T 125 receives predetermined data and a case where the FAX unit I/F 123 receives FAX data, the interruption from the sleep state to the active state is issued. In addition, in a case where the touch sensor of the operation unit 116 senses the user operation and a case where the original detection sensor senses the original, the interruption from the sleep state to the active state is issued. When the CPU 111 receives the interruption, the power state of the MFP 101 shifts the power state from the sleep state to the active state.

The power off state is a power state in which the MFP 101 power supply to the respective units of the MFP 101 is stopped. In the power off state, the power supply to the control unit 110, the printing unit 120, the reading unit 118, and an operation unit 115 is stopped.

A hardware configuration of the mobile terminal will be described with reference to FIG. 6. An apparatus such as a smart phone or a tablet PC is assumed as the mobile terminal 102 according to the present exemplary embodiment, but the mobile terminal 102 is not limited to a smart phone or a tablet PC as long as the apparatus can communicate with the MFP 101 in a wireless or wired manner.

A CPU 607 reads out a control program stored in a ROM 608 and executes various processes for controlling the mobile terminal 102. The ROM 608 stores the control program and various data such as photographs and electronic documents. A RAM 609 is a main memory of the CPU 607 and is used as a temporary storage area such as a work area of the CPU 607. An operation panel 601 is provided with a touch panel function with which the touch operation of the user can be detected and displays various screens provided by an operating system (OS) and an E-mail transmission application. The user touching the operation panel 601, results in input of a predetermined instruction to the mobile terminal 102. The mobile terminal 102 can be provided with a hardware key (not illustrated), and the user can also input the predetermined instruction to the mobile terminal 102 by using this hardware key. A camera 604 performs imaging based on an imaging instruction of the user. In addition, information can be obtained from a two-dimensional barcode imaged by the camera 604 by using a program with which a two-dimensional barcode analysis can be performed.

The mobile terminal 102 is provided with an NFC I/F 605, a Bluetooth® I/F 606, and a wireless LAN I/F 610. The mobile terminal 102 can perform transmission and reception of the data with the external apparatus via the NFC I/F 605, the Bluetooth® I/F 606, or the wireless LAN I/F 610.

Figure 7:
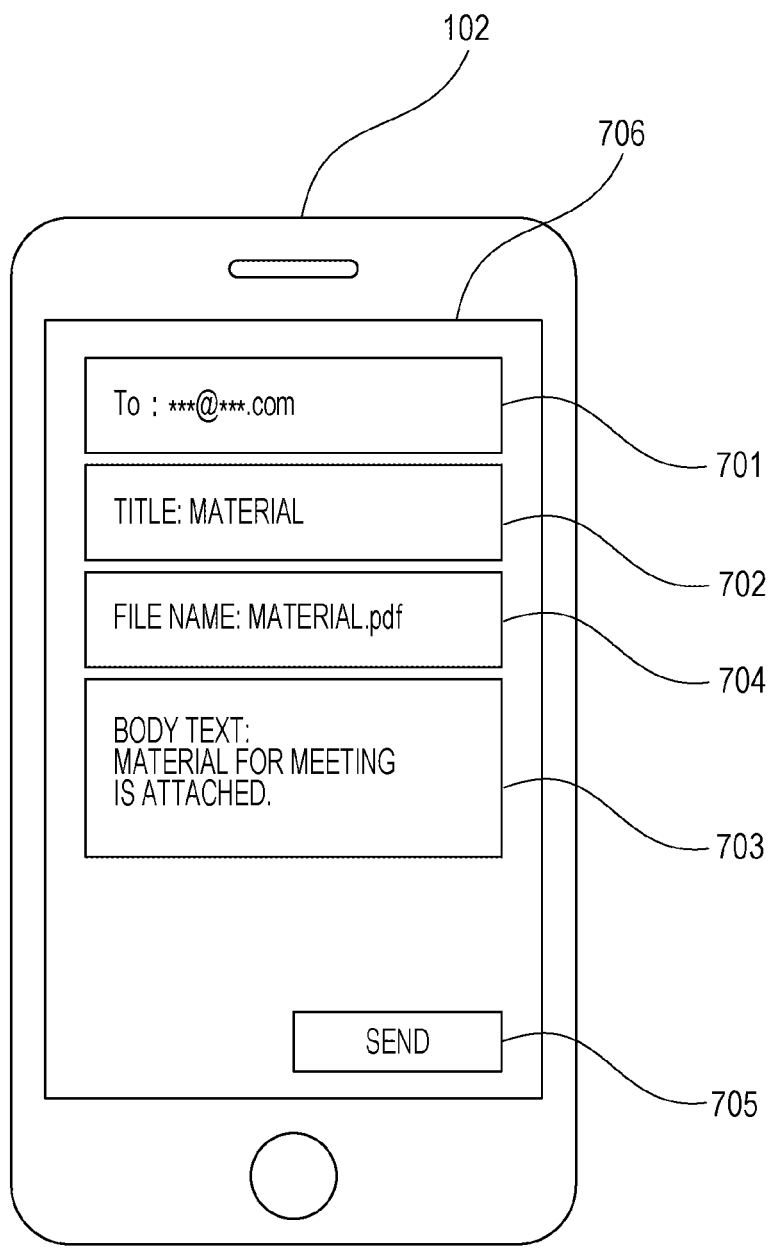
FIG. 7 illustrates a screen where setting data to be transmitted from the mobile terminal to the MFP is input.

FIG. 7 illustrates a screen for inputting the setting data to be transmitted from the mobile terminal 102 to the MFP 101.

The user activates an application downloaded to the mobile terminal 102 and can transmit the setting data to the MFP 101 by using a destination transmission function of the application. FIG. 7 illustrates a setting screen 706 for inputting the above-described setting data corresponding to a screen displayed when the destination transmission function is selected. An E-mail address field 701, a title field 702, a body text field 703, a file name field 704, and a send button 705 are displayed on the setting screen 706. The setting screen 706 can also include a CC field and a BCC field, and an E-mail address input in this CC field and an E-mail address input in this BCC field are respectively input to a CC field and a BCC field illustrated in FIG. 4D.

The user can input arbitrary character strings in the E-mail address field 701, the title field 702, the body text field 703, and the file name field 704 by the software key board of the mobile terminal 102. The character strings input by the software key board as well as character strings recognized by a voice recognition function of the mobile terminal 101 can be input to these fields.

An address selected by the user from the address book saved in the mobile terminal 102 can be input in the E-mail address field 701. In addition, the mail address previously set in the mobile terminal 102 can be displayed in the E-mail address field 701 by default. The E-mail address input to the E-mail address field 701 is set in a destination field (FIG. 11B) on an E-mail transmission screen 1102 of the MFP 101, which will be described below.

The title of the E-mail is input in the title field 702. The title input in the title field 702 becomes the title of the E-mail transmitted by the MFP 101 that has received the setting data. The title input in the title field 702 is displayed on a screen (not illustrated) when the title/body text display field 416 on the E-mail check screen 413 of FIG. 4 is selected by the user.

The body text of the E-mail is input in the body text field 703. The body text input in the body text field 703 becomes the body text of the E-mail transmitted by the MFP 101 that has received the setting data. The body text input in the body text field 703 is displayed on a screen (not illustrated) when the title/body text display field 416 on the E-mail check screen 413 of FIG. 4 is selected by the user.

The file name of the file attached to the E-mail is input in the file name field 704. The file name input in the file name field 704 becomes the file name of the data attached to the E-mail to be transmitted by the MFP 101.

The send button 705 is a button for transmitting the setting data input in the above-described fields to the MFP 101. In a case where the transmission destination of the setting data is already registered, the setting data is transmitted based on the selection of the send button 705. In a case where the transmission destination of the setting data is not registered, based on the selection of the send button 705, the camera 604 is activated to read a two-dimensional barcode, which will be described below.

Figure 8:
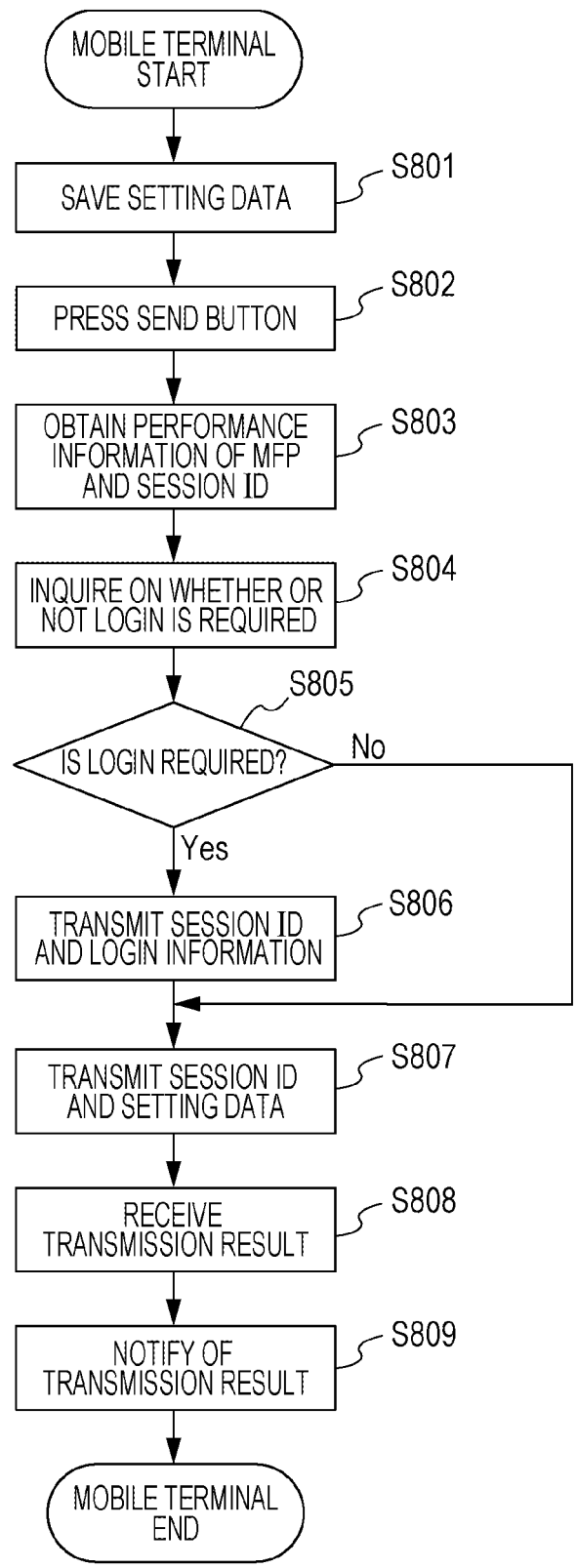
FIG. 8 is a flow chart illustrating processing for the mobile terminal to transmit the setting data.

FIG. 8 is a flow chart illustrating processing for the mobile terminal to transmit the setting data. Respective processes in this flow chart are executed by the CPU 607 of the mobile terminal 102 that has executed the program read out from the ROM 608 or the like. First, the user of the mobile terminal 102 downloads an application for transmitting the setting data to the MFP 101 from a predetermined server and activates the downloaded application. The user then activates the camera 604 of the mobile terminal 102 and a two-dimensional barcode in which a service set identifier (SSID) or the network key is embedded on the touch panel 301 of the MFP 101 is displayed. When the two-dimensional barcode is imaged using the camera 604, the MFP 101 is registered as a device in cooperation with the mobile terminal 102.

The CPU 607 saves the setting data input in the E-mail address field 701, the title field 702, the body text field 703, and the file name field 704 on the setting screen 706 (S801). When the CPU 607 detects the press of the send button 705 (S802), performance information of the MFP 101 and the session ID are obtained (S803). The performance information is, for example, a setting on whether the data reception from the mobile terminal 102 is permitted, a transmission function restriction setting, and a new destination restriction setting that are obtained in a flow chart in FIG. 10 which will be described below.

Then, the CPU 607 inquires the MFP 101 on whether login to the MFP 101 is required (S804). When it is determined that the login to the MFP 101 is required (S805: Yes), the CPU 607 transmits the session ID obtained in S803 and login information to the MFP 101 (S806). This login information is information previously set by the user. Then, the CPU 607 transmits the session ID obtained in S803 and the setting data saved in S801 to the MFP 101 (S807). In addition, in S805, when no login to the MFP 101 is required (S805: Yes), the CPU 607 transmits the session ID obtained in S803 and the setting data saved in S801 to the MFP 101 (S807).

Then, the CPU 607 receives a transmission result of the setting data from the MFP 101 (S808) and displays the received transmission result for the user (S809).

Figure 9:
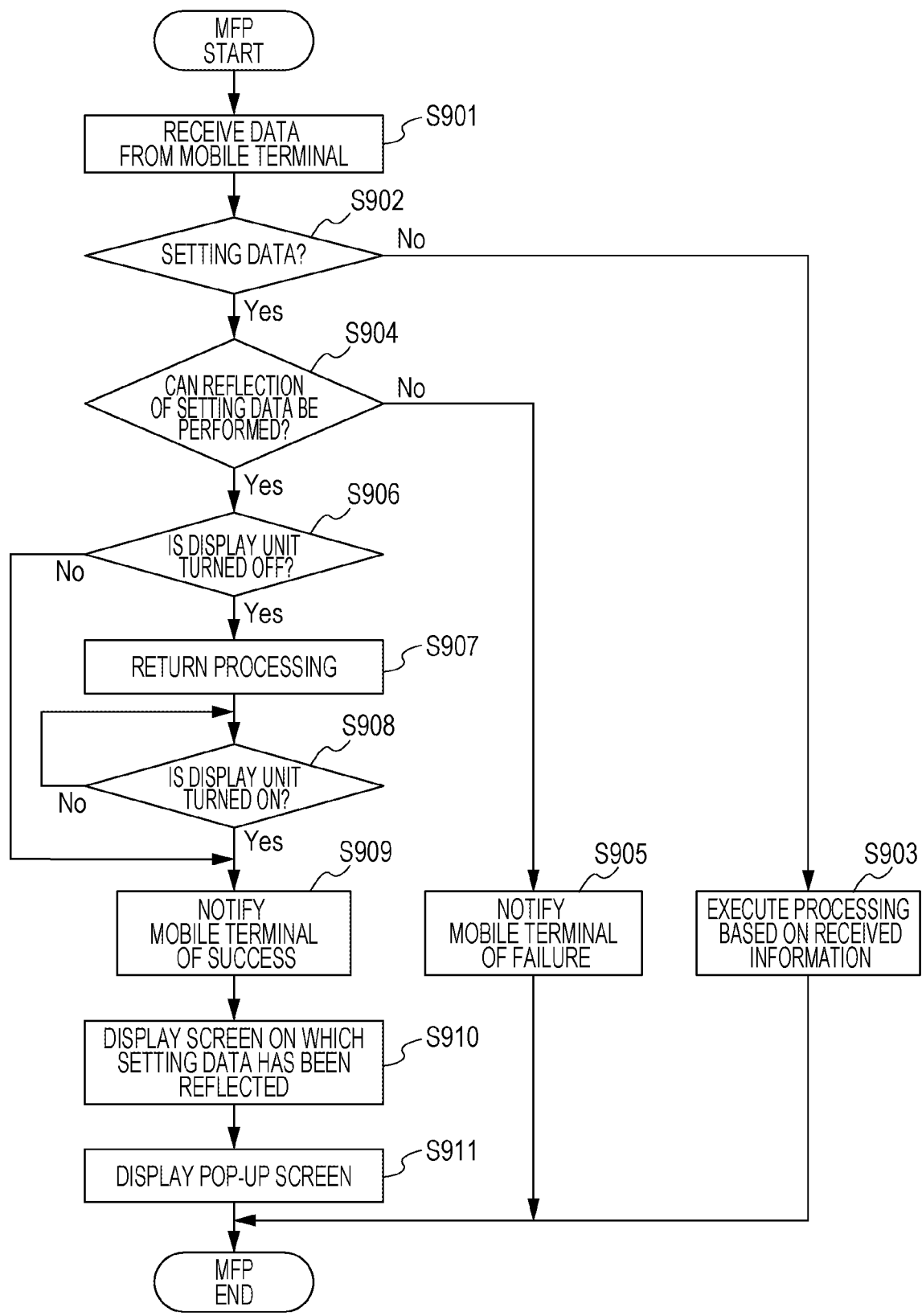
FIG. 9 is a flow chart illustrating processing executed by the MFP that has received the setting data from the mobile terminal.

FIG. 9 is a flow chart illustrating processing executed by the MFP 101 that has received the setting data from the mobile terminal 102. Respective processes in the flow chart illustrated in FIG. 9 are executed by the CPU 111 that executes the control program stored in the ROM 112 or the storage 114.

The CPU 111 receives the data transmitted by the mobile terminal 102 (S901). Then, the CPU 111 determines whether the data received in S901 is the setting data. In a case where it is determined that the data is not the setting data, the flow shifts to S903. In a case where it is determined that the data is the setting data, the flow shifts to S904. According to the present exemplary embodiment, the CPU 111 determines that the data is data dealt with by a predetermined software module based on a protocol (HTTP) and a particular character string in URL. According to the present exemplary embodiment, the CPU 111 determines that the data is data dealt with by the predetermined software module when the URL transmitted from the mobile terminal 102 includes the particular character string.

Then, the CPU 111 determines whether the data is the setting data based on the contents of the request transmitted from the mobile terminal 102. According to the present exemplary embodiment, the CPU 111 determines that the contents are the setting data when it is determined that the contents of the request transmitted from the mobile terminal 102 are data settings. The CPU 111 determines that the contents are not the setting data when the contents of the request transmitted from the mobile terminal 102 are obtainment of the performance information and the login request.

In S902, when it is determined that the contents are not the setting data, the CPU 111 executes the processing based on the received information (S903). For example, when the performance information transmitted from the mobile terminal 102 and the obtainment request of the session ID (see S803 in FIG. 8) are received, the CPU 111 generates the session ID and saves the session ID in the RAM 113. The generated session ID and the performance information are then transmitted to the mobile terminal 102. When the login information transmitted from the mobile terminal 102 (see S806 in FIG. 8) is received in S806, the received session ID and the saved session ID are matched with each other, and the login processing is executed by the received login information.

Next, the CPU 111 determines whether the received setting data can be reflected (S904). A detail of this determination will be described below. In a case where it is determined that the received setting data is not to be reflected (S904: No), the flow shifts to S905. In a case where it is determined that the received setting data can be reflected (S904: Yes), the flow shifts to S906. In S905, the CPU 111 notifies the mobile terminal 102 of the failure of the setting reflection.

According to the present exemplary embodiment, in S906, the CPU 111 then determines whether the touch panel 301 of the operation unit 116 is turned off. According to the present exemplary embodiment, in a case where the MFP 101 is in the power saving state or the sleep state, it is determined that the touch panel 301 is turned off. In a case where it is determined that the touch panel 301 is turned off, the flow shifts to S907. In a case where it is determined that the touch panel 301 is not turned off, the flow shifts to S909.

In S907, the CPU 111 performs return processing. In the return processing, the transition from the power saving state to the active state illustrated in FIG. 5 and the transition from the sleep state to the active state are performed. Then, the CPU 111 determines whether the touch panel 301 of the operation unit 116 is turned on (S908). When the touch panel 301 is turned on, the CPU 111 notifies the mobile terminal 102 of the success of the reflection of the setting data (S909). The CPU 111 then displays the transmission screen on which the setting data has been reflected (S910). Finally, the CPU 111 displays the pop-up screen of the setting completion (S911).

In FIG. 9, after the mobile terminal 102 is notified of the success of the reflection of the setting data, the transmission screen on which the setting data has been reflected is displayed. However, after the transmission screen on which the setting data has been reflected is displayed, the mobile terminal 102 can be notified of the success of the reflection of the setting data.

Figure 10:
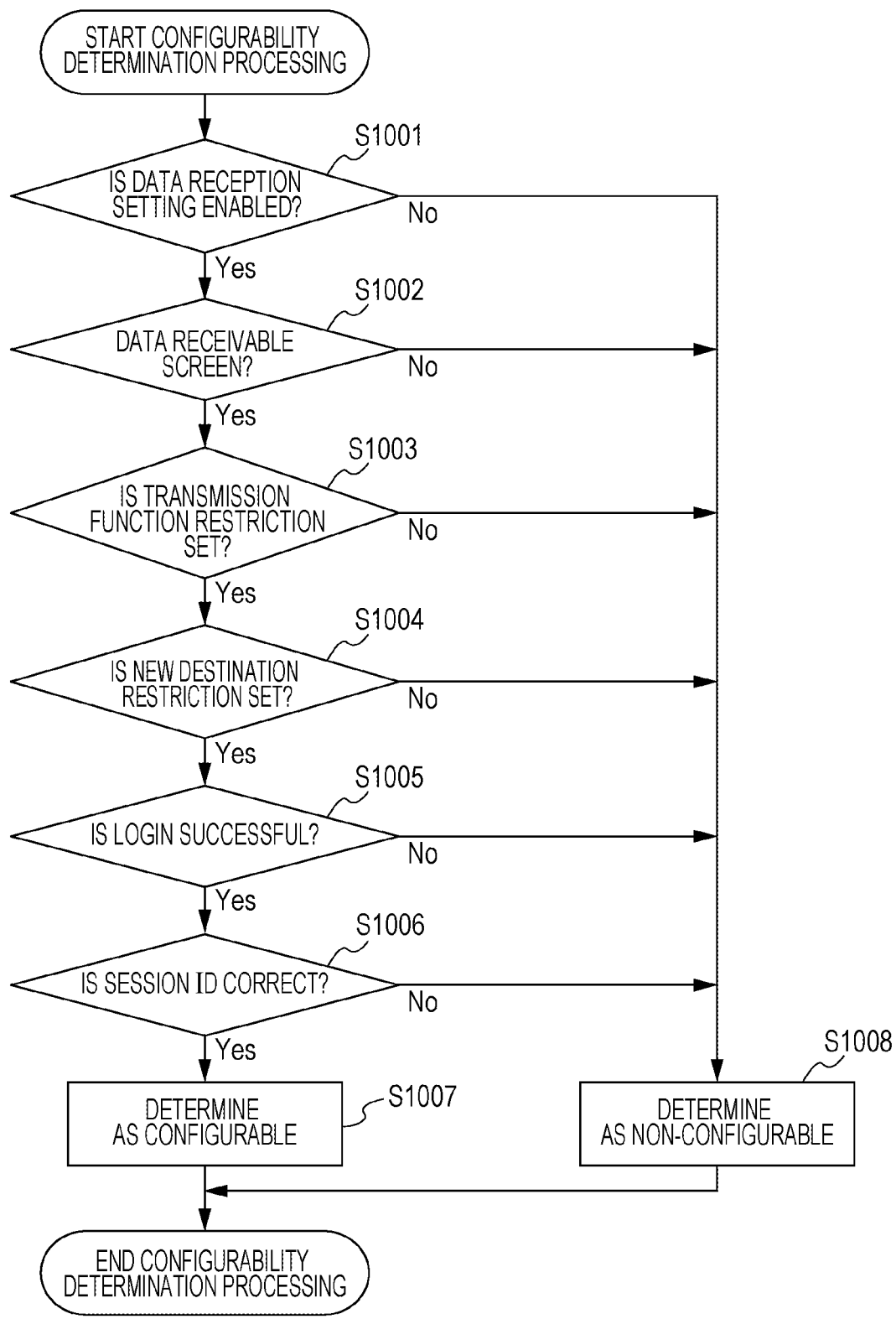
FIG. 10 is a flow chart for determining whether or not the MFP can reflect the setting data received from the mobile terminal.

FIG. 10 is a flow chart for the MFP to determine whether the received setting data can be reflected from the mobile terminal. More specifically, FIG. 10 is a flow chart illustrating a detail of S902 in FIG. 9.

In S1001, the CPU 111 determines whether the reception of data from the mobile terminal 102 is permitted based on a body text setting of the MFP 101. In a case where it is determined that the data reception is permitted, the flow shifts to S1002. In a case where it is determined that the data reception is not permitted, the flow shifts to S1008.

In S1002, the CPU 111 determines whether the screen is a setting data receiving screen. In a case where it is determined that the screen displayed on the touch panel 301 is a predetermined screen (hereinafter, the predetermined screen will be referred to as a setting data receiving screen), the flow shifts to S1003. In a case where it is determined that the screen is not the setting data receiving screen, the flow shifts to S1008. Herein, the setting data receiving screen refers to the screen illustrated in FIG. 11A, FIG. 11B, FIG. 11C, and FIG. 11D. According to the present exemplary embodiment, even when the screen is not the setting data receiving screen, in a case where the touch panel 301 is turned off, the flow shifts to S1003.

In S1003, the CPU 111 determines whether the transmission function restriction is set as the body text setting of the MFP 101. In a case where it is determined that the transmission function restriction is not set, the flow shifts to S1004. In a case where it is determined that the transmission function restriction is set, the flow shifts to S1008. Herein, the transmission function restriction means that the transmission functions such as E-mail, SMB, FTP, IFAX, and FAX are set to be unusable by an administrator.

In S1004, the CPU 111 determines whether the new destination restriction is set as the body text setting of the MFP 101. In a case where it is determined that the new destination restriction is not set, the flow shifts to S1005. In a case where it is determined that the new destination restriction is set, the flow shifts to S1008. Herein, the new destination restriction is a function for restricting the transmission to destinations other than the destinations registered in the address book of the MFP 101.

In S1005, the CPU 111 determines whether the login based on the login information received in S806 is successful. In a case where the login is successful, the flow shifts to S1006. In a case where the login fails, the flow shifts to S1008. In a case where the login is not required and the login information is not received, the flow shifts to S1006. In S1006, the CPU 111 determines whether the session ID received in S807 and the saved session ID are matched with each other. In a case where the IDs are matched with each other, the flow shifts to S1007. In a case where the IDs are not matched with each other, the flow shifts to S1008. In S1007, the CPU 111 determines as configurable and ends the processing. In S1008, the CPU 111 determines as non-configurable and ends the processing.

FIGS. 11A to 11D illustrate a screen where the reception of the setting data from the mobile terminal 102 can be accepted (setting data receiving screen). The setting data receiving screen is a home screen 1101, the E-mail transmission screen 1102, a mobile portal screen 1103, and a FAX transmission screen 1106. When the screen where the setting data can be received from the mobile terminal 102 is limited to the above-described four screens, it is possible to avoid a situation where an operation of the user who operates a screen other than these screens is disturbed by the reception of the setting data.

The setting data receiving screen can also be a screen other than the above-described four screens.

Figure 11A:
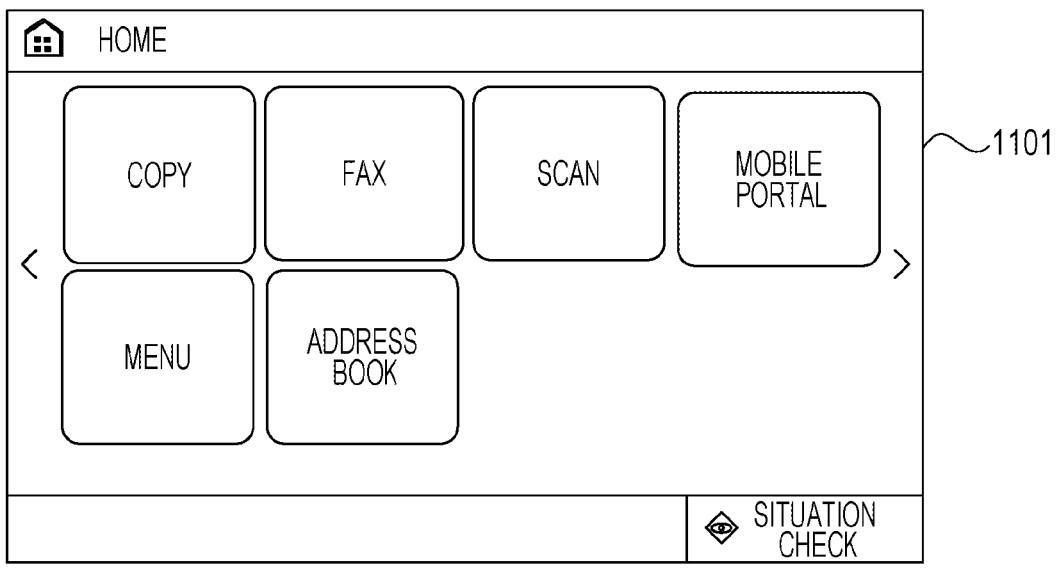
FIGS. 11A to 11D illustrate a screen where reception of the setting data from the mobile terminal can be accepted.

The home screen 1101 illustrated in FIG. 11A is the same screen as the home screen 308 illustrated in FIG. 3, which corresponds to the default standby screen of the MFP 101. When the setting data is received from the mobile terminal 102 during the display of the home screen 1101, the pop-up screen 402 illustrated in FIG. 4 is displayed. Thereafter, when the close button 403 on the screen 402 is pressed, the E-mail transmission screen 1102 on which the received setting data has been reflected is displayed.

Figure 11B:
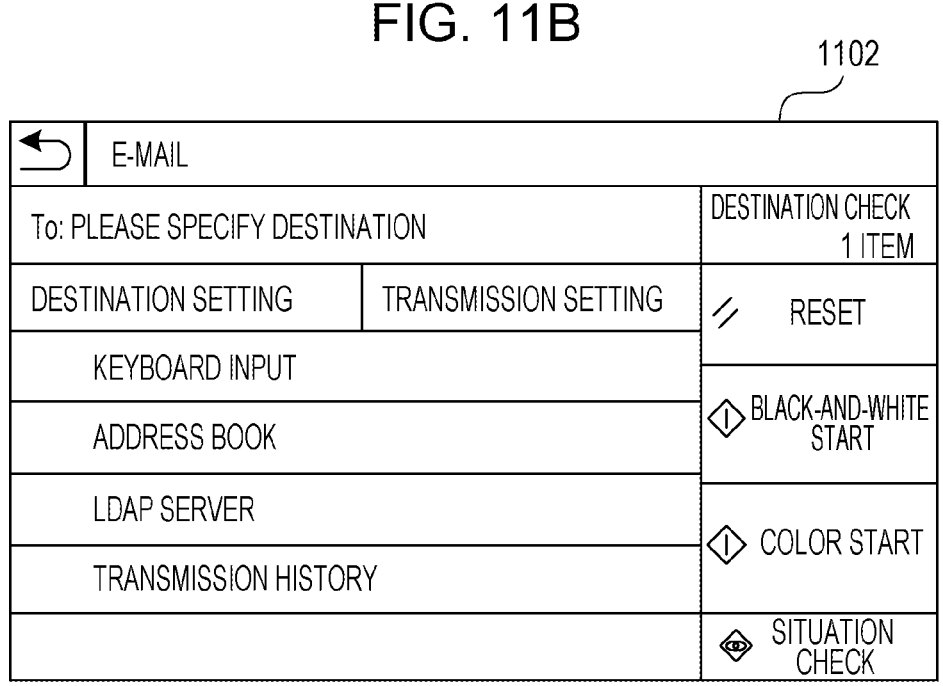

The E-mail transmission screen 1102 in FIG. 11B is a screen displayed when the E-mail transmission is performed, and the setting data received from the mobile terminal 102 is set on the E-mail transmission screen 1102. The E-mail transmission screen 1102 includes the destination field for inputting the E-mail address and the like. The MFP 101 according to the present exemplary embodiment adds the E-mail address to the destination in a case where the E-mail address is received from the mobile terminal 102. In addition, in a case where the MFP 101 receives the setting data such as the title, the body text, and the file name, even when the already input information exists, the information is overwritten by the received setting data. When the setting data is received from the mobile terminal 102 during the display of the E-mail transmission screen 1102, the pop-up screen 402 illustrated in FIG. 4 is displayed. Thereafter, when the close button 403 on the screen 402 is pressed, the E-mail transmission screen 1102 on which the received setting data has been reflected is displayed.

Figure 11C:
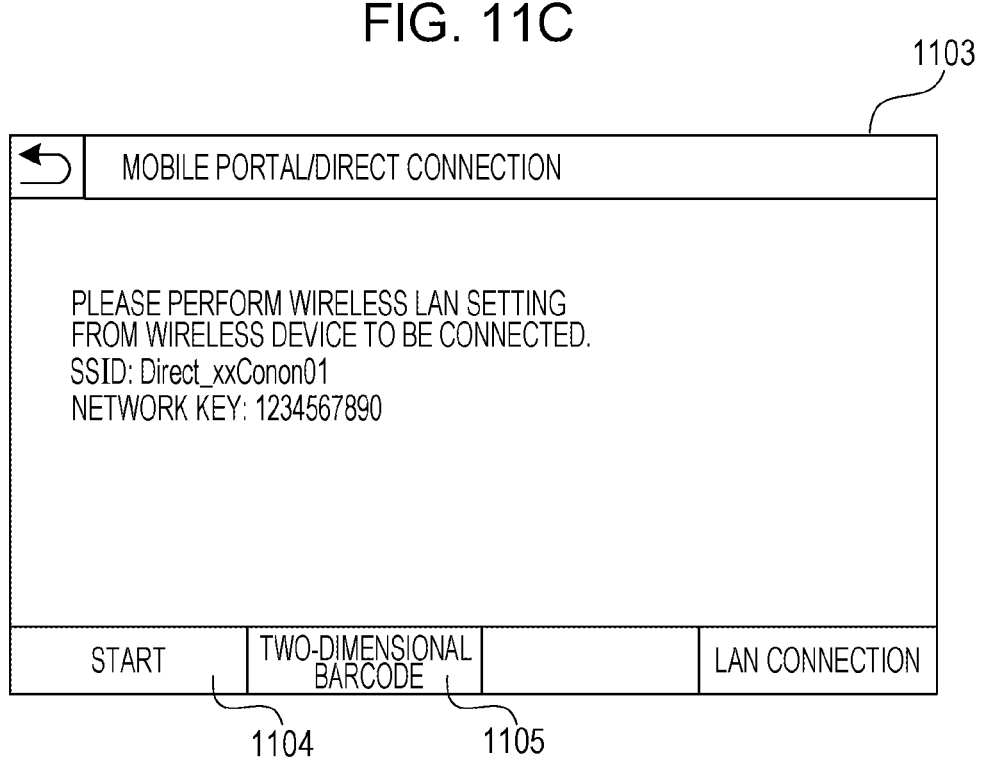

The mobile portal screen 1103 illustrated in FIG. 11C is a setting screen for connecting the mobile terminal 102 and the MFP 101 to each other. When the SSID and the network key displayed on the mobile portal screen 1103 are set in the mobile terminal 102, the mobile terminal 102 can perform a wireless communication with the MFP 101 by a direct connection. A two-dimensional barcode button 1105 is a button for displaying the above-described SSID and the two-dimensional barcode in which the network key is embedded. When the two-dimensional barcode is captured by using the camera 604 of the mobile terminal 102, the MFP 101 can be registered as a communication partner of the mobile terminal 102. When the setting data is received from the mobile terminal 102 during the display of the mobile portal screen 1103, the pop-up screen 402 illustrated in FIG. 4 is displayed. Thereafter, when the close button 403 on the screen 402 is pressed, the E-mail transmission screen 1102 on which the received setting data has been reflected is displayed.

Figure 11D:
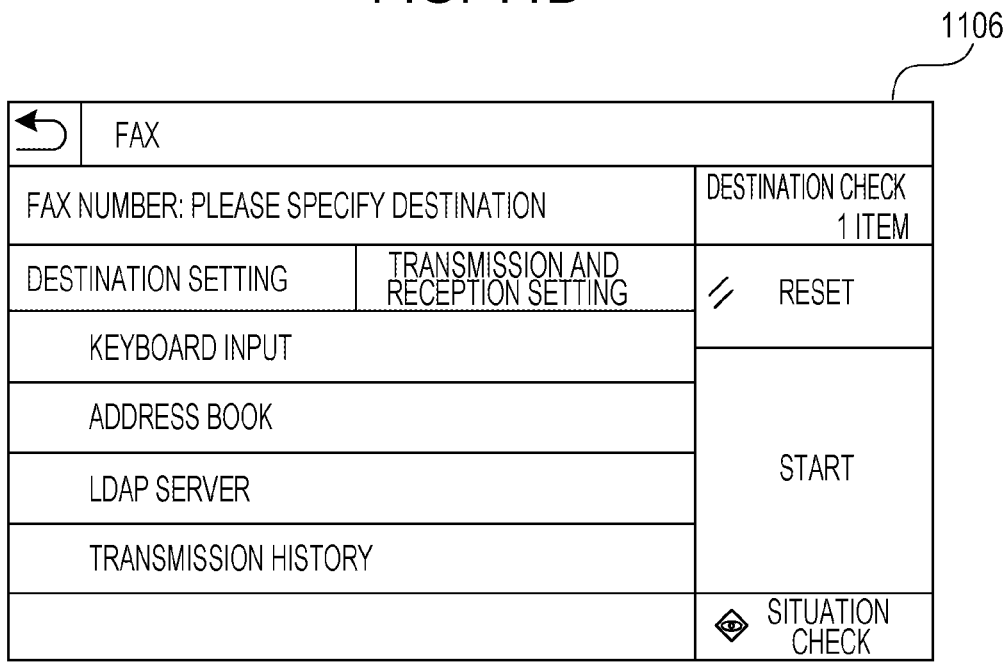

The FAX transmission screen 1106 of FIG. 11D is a screen to be displayed when the FAX transmission is performed. The FAX transmission screen 1106 includes a field for inputting a FAX number and the like. When the setting data is received from the mobile terminal 102 during the display of the FAX transmission screen 1106, the pop-up screen 402 illustrated in FIG. 4 is displayed. Thereafter, when the close button 403 on the screen 402 is pressed, the FAX transmission screen 1106 on which the received setting data (such as the FAX number) has been reflected is displayed.

When the screen where the setting data can be accepted from the mobile terminal 102 is specified, it becomes possible to avoid the display of the pop-up screen 402 during the operation on the other screen.

According to the present exemplary embodiment, when the setting data is received from the mobile terminal 102 while the touch panel 301 is turned off, the pop-up screen 402 illustrated in FIG. 4 is displayed. Thereafter, when the close button 403 on the screen 402 is pressed, the E-mail transmission screen 1102 on which the received setting data has been reflected is displayed.

According to the present exemplary embodiment, even when the MFP 101 is in the power saving state or the sleep state and the touch panel 301 is in the turned-off state, the touch panel 301 enters the turned-on state by the transmission of the setting data by the mobile terminal 102, and the E-mail setting screen 1102 is also displayed.

OTHER EMBODIMENTS

According to the above-described exemplary embodiment, an MFP has been described as an example of the data transmission apparatus of the present invention, but a configuration in which the data transmission apparatus of the present invention is not an MFP can also be adopted. For example, in another exemplary embodiment, the data transmission apparatus can be a scanner apparatus that does not include the print function or a FAX apparatus.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-109865, filed Jun. 7, 2018, which is hereby incorporated by reference herein in its entirety.

What is claimed is:

1. An image processing apparatus that reads an image of a document to generate image data based on the image and transmits image data, the image processing apparatus comprising:
    a receiver configured to receive destination information from an external apparatus by wireless communication;
    a display;
    a controller configured to cause, based on receipt of the destination information, the display to display at least the received destination information; and
    a transmitter configured to transmit the generated image data based on a destination corresponding to the displayed destination information,
    wherein the controller determines whether data received from the external apparatus is the destination information, and
    wherein the controller turns on the display based on receipt of an access from the external apparatus and then causes the display to display at least the destination information that is received based on the access, in a case where it is determined that the data received from the external apparatus on the access is the destination information.

2. The image processing apparatus according to claim 1, wherein the transmitter transmits the generated image data as facsimile data.

3. The image processing apparatus according to claim 1, wherein the transmitter transmits the generated image data as attachment data of an E-mail.

4. The image processing apparatus according to claim 3, wherein the receiver further receives one or more of a title of the E-mail, a body text of the E-mail, or a file name of the attachment data from the external apparatus by the wireless communication, and
    wherein the transmitter transmits the E-mail to which any one of the received title, the body text, or the file name is set.

5. The image processing apparatus according to claim 1, wherein the controller does not turn one the display in a case where it is determined that the data received from the external apparatus on the access is data other than the destination information.

6. The image processing apparatus according to claim 5, wherein the controller determines whether the data received from the external apparatus is the destination information based on contents of a request transmitted from the external apparatus.

7. The image processing apparatus according to claim 6, wherein the controller determines that the data received from the external apparatus is the destination information when at least a protocol of the request is HTTP.

8. The image processing apparatus according to claim 7, wherein the controller determines that the data received from the external apparatus is the destination information when a specific character string is included in a uniform resource locator.

9. The image processing apparatus according to claim 1, wherein the controller does not cause the display to display the destination information when another screen other than a predetermined screen is displayed.

10. The image processing apparatus according to claim 1, wherein the controller causes the display to display one or more of a service set identifier or a network key required to communicate with the image processing apparatus.

11. The image processing apparatus according to claim 10, wherein the controller causes the display to display a two-dimensional barcode including one or more of the service set identifier or the network key.

12. The image processing apparatus according to claim 1, wherein the controller causes the display to display a two-dimensional barcode including one or more of a service set identifier or a network key required to communicate with the image processing apparatus.

13. The image processing apparatus according to claim 1, further comprising a printing unit configured to print the image on a recording medium.

14. The image processing apparatus according to claim 1, wherein an object for receiving a transmitting setting is displayed with the received destination information.

15. The image processing apparatus according to claim 1, wherein the controller causes the display to display the received destination information without receiving a user operation after receiving the destination information from the external apparatus.

16. A control method for an image processing apparatus that reads an image of a document to generate image data based on the image and transmits image data, the control method comprising:
    receiving destination information from an external apparatus by wireless communication;
    causing, based on receipt of the destination information, the display to display at least the received destination information;
    and
    transmitting the generated image data based on a destination corresponding to the displayed destination information;
    determining whether data received from the external apparatus is the destination information; and
    turning on the display based on receipt of an access from the external apparatus and then causing the display to display at least the destination information that is received based on the access, in a case where it is determined that the data received from the external apparatus is the destination information.

17. The control method according to claim 16, wherein the generated image data is transmitted based on the destination information as facsimile data.

18. The control method according to claim 16, wherein the generated image data is transmitted based on the destination information as attachment data of an E-mail.

19. The control method according to claim 18, further comprising receiving one or more of a title of the E-mail, a body text of the E-mail, or a file name of the attachment data from the external apparatus by the wireless communication,
   wherein the E-mail to which any one of the received title, the body text, or the file name is set is transmitted.

20. The control method according to claim 16, wherein the display displays the received destination information without receiving a user operation after receiving the destination information from the external apparatus.

* * * * *